July 10, 1923.

A. H. LENT 1,461,246

FISHING TACKLE

Filed July 15, 1922

INVENTOR
ALFRED H. LENT
BY
Harry C. Schroeder
ATTORNEY

July 10, 1923.
A. H. LENT
1,461,246
FISHING TACKLE
Filed July 15, 1922
2 Sheets-Sheet 2
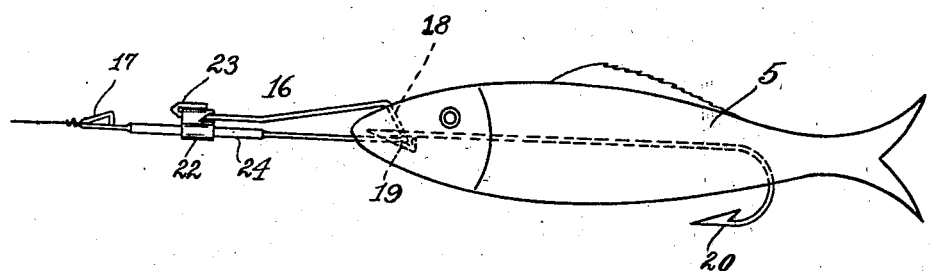
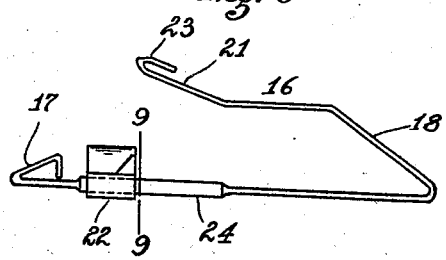
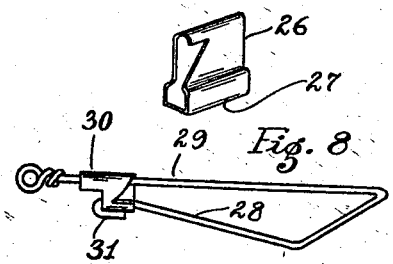
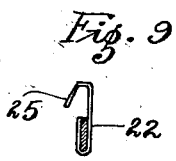
INVENTOR
ALFRED H. LENT
BY
Harry C. Schroeder
ATTORNEY

Patented July 10, 1923.

1,461,246

UNITED STATES PATENT OFFICE.

ALFRED H. LENT, OF CAPITOLA, CALIFORNIA.

FISHING TACKLE.

Application filed July 15, 1922. Serial No. 575,146.

*To all whom it may concern:*

Be it known that I, ALFRED H. LENT, a citizen of the United States, residing at Capitola, in the county of Santa Cruz and State of California, have invented certain new and useful Improvements in Fishing Tackle, of which the following is a specification.

My invention is an improved fastening link for fishing tackle, the object of which is to prevent a hooked fish from opening the link in the struggle. My link is inserted partly into the mouth of the lure fish in such a manner as to keep the mouth closed while being trolled through the water, so that the bait is life-like in action.

With the use of my invention, it can be seen that the pull of the line on the body of the bait fish is eliminated as the jaws and head of the bait fish bears the tension without mutilating the body and taking away from the life-like appearance.

My invention is simple in construction, effective in operation, and inexpensive to manufacture.

Referring to the drawing which forms a part of this specification:

Figure 5 is a side view of a modified form of my invention secured to a bait.

Figure 6 is a modified form of my invention in unlocked position.

Figure 7 is a perspective view of a modified form of locking sleeve.

Figure 8 is a side view of a further modification of my invention.

Figure 9 is a sectional view taken on line 9—9 of Figure 6.

Figure 1:
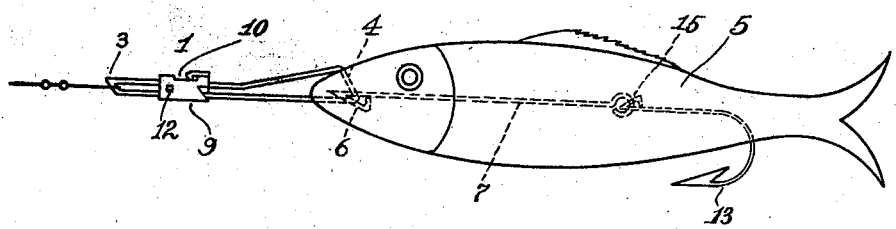
Figure 1 is a side view of my fastener secured to a live bait.
Figure 2:
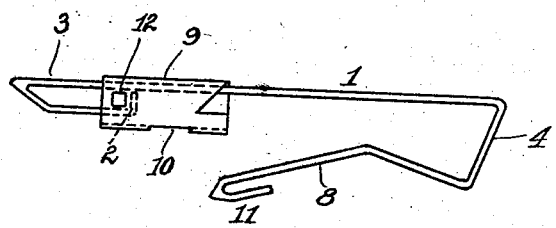
Figure 2 is a side view of my fastener in the unlocked position.
Figure 3:
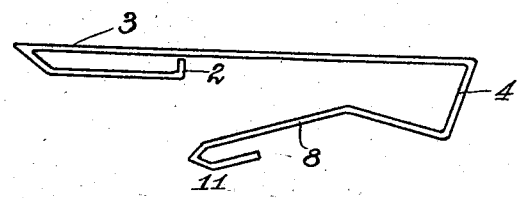
Figure 3 is a side view of my invention with the locking sleeve removed.
Figure 4:
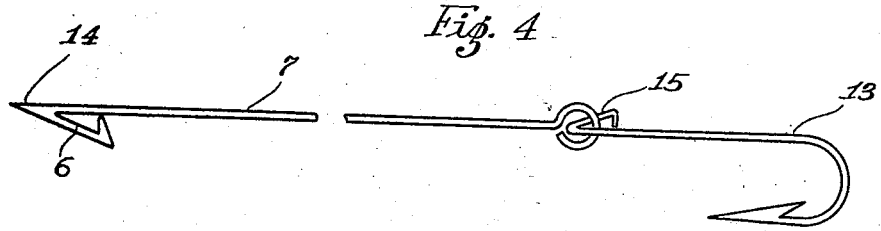
Figure 4 is a side view of my wire extension and hook.

Referring more particularly to the drawing, numeral 1 indicates a fastening link formed of a single piece of wire, the end of which is bent upwardly as at 2. A loop 3 is formed in the forward end of the link to which the fishing line is secured. At the rear of the link 1 is formed an enlarged angular loop 4 which passes through the mouth of the bait or lure 5, and through the loop 6 of extension 7. This arrangement holds the mouth closed in a life-like position and holds the hook so that it cannot be disengaged. The locking arm 8 extends forwardly from the enlarged loop 4 and is adapted to extend into the locking sleeve 9 which encircles the link 1. An aperture 10 in the upper side of the sleeve 9 receives a hook 11 on the end of arm 8. The hook 11 falling into aperture 10 prevents the retraction of the sleeve 9 when the fish is hooked.

A stop pin 12 extends through the sleeve 9 forwardly of the upturned end 2 and slides in the loop 3. The pin 12 engaging the end 2 limits the rearward movement of the sleeve 9. The extension 7 is attachable to hook 13 and is of a length to complete the distance that the hook 13 does not cover in a longer bait fish. The loop 6 is pointed at 14 and is inserted into the bait from the rear end and pushed forward until it engages the opening 4. In using my link on small bait, the extension 7 is not used, but the hook 13 is connected directly with opening 4 by the loop 15.

In the modified form of my invention, shown in Figures 5 to 9, inclusive, the fastening link 16 has a loop 17 formed in the forward end thereof for the reception of the line. The rear loop 18 is inserted into the mouth of lure 5 and through loop 19 of hook 20. A locking arm 21 extends forwardly into sleeve 22 and has a stop hook 23 formed on the end thereof. The sleeve 22 slides on a flattened surface 24 of the link 16 which limits the forward and rearward movement. The sleeve 22 has a hook 25 formed in the top thereof for the reception of arm 18. The modified form of sleeve shown in Figure 7 is formed of a single piece of material 26 and squared at 27 to slide on surface 24. In the modified form shown in Figure 8 the locking arm 28 of the link 29 slides upwardly to the sleeve 30 and has a hook 31 formed in the end thereof.

Having described my invention, I claim:

1. A fastening link having a loop at one end thereof, the other end of said link having an enlarged loop formed therein, a locking arm extending from said enlarged loop, a sleeve surrounding said link, said sleeve being adapted to receive the locking arm, and means for preventing said sleeve from slipping off of said locking arm.

2. A fastening link having a loop at one end thereof, the other end of said link having an enlarged loop formed therein, a locking arm extending from said enlarged loop, a sleeve surrounding said link, said sleeve being adapted to receive the locking arm, a pin through said sleeve, said pin being adapted to move in said loop, a hook on the end of the locking arm, and said sleeve having an aperture in the bottom thereof adapted to receive said hook, and an extension adapted to be connected to the fishing hook and said fastening link.

In testimony whereof I affix my signature.

ALFRED H. LENT.